United States Patent Office 3,418,275
Patented Dec. 24, 1968

3,418,275
**AROMATIC POLYAMIDES FROM
N,N'-DIPHENYL DIAMINES**
Curtis Wayne Stephens, Longwood, Wilmington, Del., assignor to E. I. du Pont de Nemours and Company, Wilmington, Del., a corporation of Delaware
No Drawing. Original application Nov. 8, 1962, Ser. No. 236,393. Divided and this application July 6, 1966, Ser. No. 563,051
4 Claims. (Cl. 260—47)

This application is a division of my application Ser. No. 236,393, filed Nov. 8, 1962, now U.S. Patent 3,296,201.

This invention relates to novel and useful compositions of matter. More particularly, it relates to a novel group of high molecular weight film- and fiber-forming nitrogen-containing condensation polymers characterized by a high degree of stability, to a process for preparing them and to shaped articles prepared therefrom.

The broad class of nitrogen-containing condensation polymers in which nitrogen atoms are included as integral parts of the polymeric chain has been recognized for many years and several members of this class of polymeric materials have achieved a notable degree of commercial success and public acceptance. The currently available nitrogen-containing condensation polymers are found to be excellently adapted for use in many areas of application. Almost without exception, they are characterized by the presence of secondary amido nitrogen atoms (to each of which is bonded a hydrogen atom). It has long been recognized by polymer chemists that the replacement of these hydrogen atoms by monovalent organic radicals leads to the formation of polymeric materials which have lower melting points and more rubbery properties than the unsubstituted polymers. For this reason, polymer chemists have, in general, tended to avoid the preparation of such polymers which lack the capacity for hydrogen bonding.

One object of this invention is to provide high molecular weight nitrogen-containing linear condensation polymers which are characterized by a high degree of thermal and hydrolytic stability and which may be formed into tough, pliable shaped articles.

Another object of this invention is to provide a process for the preparation of high molecular weight nitrogen containing condensation polymers by the condensation of weakly basic amino groups with acid halides, without the necessity of acid acceptors.

A further object of this invention is to provide such condensation polymers which, in the form of fibers, may be utilized in the preparation of fabrics which are characterized by being truly wash-wearable. By "wash-wear performance" is meant the ability to be washed and then worn without the need of ironing. Certain currently available polyesters, such as poly(ethylene terephthalate), have made possible the first approach to such fabrics, but their application in articles of commerce has resulted in fabrics which, while exhibiting appreciably better wash-wear performance than those composed of natural fibers, normally require at least touch-up ironing.

Other objects will be apparent from the specification and examples to follow.

In accordance with these objects, there is provided a novel class of high molecular weight film- and fiber-forming linear condensation polymers which contain intra-linear nitrogen atoms bearing a lateral aromatic radical, which polymers are characterized by consisting essentially of recurring structural units of one of the following types:

(1) 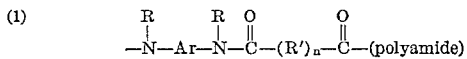

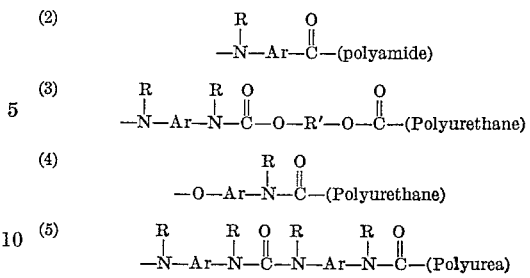

wherein R represents a monovalent aromatic radical; Ar represents a divalent aromatic radical, R' represents a divalent aromatic radical and $n$ is a cardinal number not greater than 1. The present invention also provides for preparing said polymers which comprises reacting a carbonyl halide function and a secondary amino function, both substituents on said secondary amino function being aromatic radicals, at a temperature within the range of 50–400° C., the by-product hydrogen halide being continuously removed from said reaction by volatilization. In all instances the polymers are characterized by the presence in the polymeric chain of amide-type linking units wherein the nitrogen atoms are substituted by monovalent aromatic radicals.

The presence of bulky aromatic lateral substituents on the polymeric chain surprisingly does not result in a lack of crystallizability in the polymeric compositions. Although it has been recognized for many years that increasing substitution of the amido nitrogen atoms in aliphatic polyamides results in a diminution of useful properties, it is noted in the series of polymers which constitute this invention that highly useful polymeric compositions result from wholly aromatic polymers containing aromatic substituents on the amido nitrogen atoms.

By the expression "consisting essentially of" is meant that no more than about 10% of the total polymeric structure may consist of units other than those described herein. The molecular weights of the polymers of this invention may be varied widely, but it is preferred that the polymers have a molecular weight of at least about 10,000 and, more especially, of at least about 25,000 or higher.

Further in accordance with the above mentioned objects, there are provided shaped articles comprising the polymers of this invention. Such articles may consist entirely of the instant polymers, e.g., films and filaments, or only partly so, e.g., coated wire and laminated sheets. Preferred are those articles consisting entirely of the polymers of this invention. Particularly preferred are those articles which have the transverse dimension (diameter or thickness) greatly exceeded by the longitudinal dimension, in which category are included films, fibers, filaments, strand, pellicles, and the like. These shaped articles may be readily prepared either from solutions of the polymers in suitable solvents, by melt shaping, or by other recognized procedures, as will be further described hereinafter. The shaped articles may be oriented by attenuation or drawing, by which process their properties are appreciably improved.

The polymers of this invention may be prepared in accordance with a solution technique, by which the polymer-forming reactant or mixture of reactants is dissolved in a suitable solvent and the solution is maintained at a temperature such that the condensation reaction proceeds at a reasonable rate. Temperatures in the range of 50° to 400° C. are normally satisfactory, and the desired temperature may frequently be obtained by choosing a solvent such that its temperature of reflux is within the desired range. Preparation of the polymers in solution is readily effected, particularly since no acid acceptor is required.

Isolation of the polymeric material is effected by standard procedures.

The polymer-forming reaction by which the polymers of the present invention are prepared normally involves the condensation of a multiplicity of difunctional organic molecules, each individual condensation being effected by the reaction of a substituted amino group with an appropriate acid group, or a derivative thereof whether that latter group be a carbonyl halide group to produce a polyamide, a chloroformate or carbonate ester to produce a polyurethane, or phosgene or a carbamic acid derivative to produce a polyurea. Where a diamine constitutes one difunctional reactant, a wholly aromatic disecondary diamine is employed. Diamines of this type have long been recognized as being unstable to oxidation, showing evidences of degradation even upon exposure to air. They have also been recognized as possessing extremely low base strength, forming readily hydrolyzed salts even with strong acids. It is therefore surprising that such diamines can be successfully utilized as polymer-forming reactants, and particularly surprising that the resulting polymers are of high molecular weight, oxidatively and hydrolytically stable, and capable of the formation of tough and flexible shaped articles.

In certain instances, where a polyurethane is the desired product, the polymer-forming reaction may involve, at each point of condensation, the reaction between a nitrogen-substituted carbamic acid group with an appropriate hydroxyl group. Among suitable acid components, the free acids may be employed where they are available and stable, or the various conventional acid derivatives may be utilized, as the aliphatic or aromatic esters or the sulphur analog thereof, the anhydrides, the amides, the acid halides, and the like. Generally, it is preferred to employ the acid halides, and it is with this reactive acid derivative that the remainder of this discussion will be concerned.

It will be apparent that, when a linear high molecular weight polymeric material is to be provided, a reaction between difunctional starting materials is required. Such starting materials may include within one molecule the two types of necessary functional groups (as, e.g., a nitrogen-substituted amino function and an acid chloride function) in which case the polymerization proceeds by a process of self-condensation. Alternatively, the starting materials may contain two functional groups of the same type in any one molecule, in which case two types of reactant are required (as e.g., one reactant, each molecule of which contains two nitrogen-substituted amino functions, being condensed with a second reactant, each molecule of which contains two acid chloride groupings).

The preferred process of this invention comprises the elimination of the elements of a hydrogen halide from between equimolar quantities of an active-hydrogen function and a carbonyl halide function, as follows:

wherein X represents a halogen, preferably chlorine, and B represents a diarylamino radical or, when COX is attached to nitrogen, an aryloxy radical. This process is facilitated by the application of heat, and by permitting the hyrogen halide to escape from the reaction zone by volatilization, and does not employ the presence of an acid-acceptor such as an organic or inorganic base in order to effect substantially complete conversion of the reactants. Condensations of this type, when carried out with HB compounds in which B is a nitrogen atom to which is attached one or two hydrocarbon radicals, one or more of the latter being saturated, require the presence of at least one equivalent of a base for each mole of hydrogen halide formed. This is thought due to the binding of the hydrogen halide to the amino groups through salt-formation, thereby making the amine function inert to acylation by the halocarbonyl function. The acid-acceptors are believed to prevent this salt-formation by preferentially binding the hydrogen halide. The diaryl amine-type HB functions of this invention do not employ the presence of an acid-acceptor, and accordingly, the halide is free to escape from the polymerization zone by volatilization.

In the above formulae Ar has been defined as a divalent aromatic radical. It may represent m- or p-phenylene, 1,3-naphthylene, 1,4-naphthylene, 1,5-naphthylene, 2,6-naphthylene, p,p'-biphenylene, m,m'-biphenylene, or the like, or a radical having two or more aromatic nuclei linked by a methylene group, a substituted methylene group, a sulfone group, an ether linkage, or other small divalent linking unit, as bis(p - phenylene)methane, bis (m-phenylene)methane, 2,2 - bis(p-phenylene)propane, bis(p-phenylene)sulfone, bis(p-phenylene) ether, and the like. Any of the aromatic nuclei in the above listing may additionally bear one or more nuclear substituents, such as halogen atoms, lower alkyl groups, and the like, which are non-reactive under the conditions used to prepare the polyamides. The preferred divalent aromatic radicals are p-phenylene, m-phenylene, p,p'-biphenylene, bis(p-phenylene) ether, bis(p-phenylene) sulfone, and their nuclearly chlorinated derivatives. Of particular interest among these preferred radicals are p-phenylene, m-phenylene, and p,p'-biphenylene. R' is a divalent aromatic radical selected from among those defined above for Ar. When the subscript $n$ in Formula 1 is zero, the term "$(R')_n$" is a carbon-to-carbon bond. The monovalent aromatic radical R is preferably phenyl, but may also represent a substituted phenyl having up to five substituents selected from the group consisting of lower alkyl, halogen, preferably chlorine, or p-phenyl.

The polymers of this invention possess a number of attractive and useful physical properties. In the first place, they are highly stable to prolonged exposure to heat. Shaped articles comprising these polymers retain a high percentage of their original strength when subjected to temperatures in excess of 200° C. for prolonged periods of time. Additionally, the polymers exhibit a high degree of resistance to hydrolytic media, including both hot aqueous acids or bases. They are not affected by ammonia or amines. The polymers resist combustion, and possess good electrical properties. They are soluble in a wide variety of solvents, and can generally be crystallized. The inherent viscosities of these polymers ordinarily exceed about 0.35, thereby rendering them suitable for the preparation of shaped articles. These and other noteworthy properties will be further apparent from the discussion and examples which follow.

All of the polymers of this invention are characterized by high levels of heat and flame resistance and are suitable for conversion to shaped articles resistant to hydrolysis. Their properties may perhaps best be considered with respect to the specific polymer types, i.e., polyamide, polyurethane, and polyurea.

Polyamides.—As has been pointed out above, the polyamides of this invention are derived either from N,N'-disubstituted aromatic diamines and amide-forming derivatives of aromatic dicarboxylic acids or oxalic acid, or from monomeric organic compounds which contain in each molecule both an acid function and an aromatic secondary amino group. Like other polymers of this invention, the polyamides are characterized by a high degree of thermal and hydrolytic stability, by high melting points and by the ability to form tough films and crystalline oriented fibers.

The polyamides may be prepared by the condensation of an aromatic diamine which bears an aromatic substituent on each of the amino nitrogen atoms with the acid halide of an aromatic dicarboxylic acid or with oxalyl chloride, or by the self-condensation of an aromatic organic composition, each molecule of which contains a carboxylic acid halide group and a single amino group which bears an aromatic substituent.

Among suitable aromatic diamines where each of the amino nitrogen atoms is a secondary amino group are those having the formula:

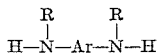

wherein Ar is a divalent aromatic radical of the types previously described, preferably hydrocarbon or halohydrocarbon comprising one or two phenylene radicals, and R is a monovalent aromatic radical as previously defined preferably a phenyl group. Thus, among diamines within the scope of this invention may be named the following: N,N'-diphenyl-p-phenylenediamine, N,N' - diphenyl - m-phenylenediamine, N,N' - diphenyl - 1,4 - naphthylenediamine, N-N'-diphenyl - 1,3 - naphthylenediamine, N,N'-diphenyl-2,6-naphthylenediamine, N,N' - diphenyl - 1,5-naphthylenediamine, N,N'-diphenylbenzidine, and the like, which may, additionally, bear nuclear substituents of the non-amide forming type.

The polyamides are prepared by the condensation of diamines of the above types with amide-forming derrivatives of dicarboxylic acids. The acid halides are generally employed, and the chlorides are normally preferred. These acid derivatives have the following structures:

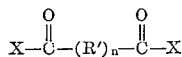

wherein X is a halogen atom and wherein R' is a divalent aromatic radical of the type described above in the definition of the Ar group preferably hydrocarbon comprising one or two carbocyclic aromatic radicals When the subscript $n$ is zero, the term "$(R')_n$" designates a carbon-to-carbon bond. Thus, among useful dicarboxylic acid derivatives may be named the following: oxalylchloride, isophthaloyl chloride, terephthaloyl chloride, 1,3 - naphthalene dicarbonyl chloride, 1,4-naphthalene dicarbonyl chloride, p,p'-biphenyl dicarbonyl chloride, the acid chloride of 4,4' - dicarboxyldiphenyl ether, and other comparable acid chlorides derived from aromatic dicarboxylic acids. Also useful are the acid bromides of these dicarboxylic acid.

The preparation of high molecular weight polyamides may be effected by dissolving equivalent amounts of the diamine and the diacid halide in a suitable solvent having a boiling point in the range of 50°–350° C. Upon maintaining the solution at the temperature of reflux for a period of 5–20 hours, a high molecular weight polymer is produced. The hydrogen chloride formed as a by-product of the condensation is volatilized under the conditions of reaction. The polymeric product may normally be isolated by cooling the reaction mixture, and filtering the precipitated polymer. In those instances where the polymer remains soluble in the cooled reaction mixture, it may be isolated by dilution of the mixture with a suitable non-solvent. Suitable solvents for effecting solution polymerization are generally chosen from the class of hydrocarbons and chlorinated hydrocarbons, as chlorobenzene, o-dichlorobenzene, toluene, xylene, tetrachloroethane, and the like. Particularly preferred is o-dichlorobenzene, whose temperature of reflux permits rapid polycondensation. By suitable modification of the above procedures, polyamide forming monomeric materials may be self-condensed to form polymeric compositions.

The polyamides prepared by the above techniques may be utilized directly in the formation of shaped articles, which may be prepared from solutions of the polymers in suitable solvents, by melt shaping, or by wet-spinning techniques. Suitable solvents include methylene chloride, N,N-dimethylformamide, 1,1,2-trichloroethane, mixtures of 1,1,2-trichloroethane and trifluoroacetic acid, and the like, and spinning solutions normally contain between 12% and 25% of the polymer. Such solutions have viscosities within the range of 100–300 poises at the spinning temperature. The dry-spinning of these polyamides may be accomplished in accordance with accepted procedures, as will be shown by the examples to follow. The resulting fibers may be drawn 2–3X or more at temperatures at or near their second order transition temperatures, producing oriented, crystalline yarns. Drawing in steam may also be effected.

These N-aryl polyamides generally have greater resistance to hydrolysis, and to thermal degradation in the presence or absence of oxygen than is exhibited by the analogous N-hydrogen or N-alkyl polyamides. These analogues differ structurally from the products of this invention only in the presence of a hydrogen atom or alkyl group substituent in place of the lateral aryl group on each nitrogen atom. Such unsubstituted or N-alkyl substituted aromatic polyamides are described in Canadian Patent 637,614. The N-aryl polyamides of the present invention cannot be made in the high molecular weight range required for making useful fibers and films by the processes known in the art for their above-mentioned analogues.

The following examples illustrate the preparation and shaping of the polyamides of this invention, but are not to be construed as limiting the scope of the invention in any way. Inherent viscosities are determined in accordance with the following formula:

$$\eta_{inh} = \frac{\ln \eta_{rel}}{c}$$

The relative viscosity ($\eta_{rel}$) may be determined by dividing the flow time in a capillary viscometer of a dilute solution of the polymer by the flow time for the pure solvent. The concentration ($c$) is 0.5 gram of polymer per 100 ml. of solution, and the measurements are made at a temperature of 30° C. The determinations are made in concentrated sulfuric acid.

EXAMPLE I

Commercial grade N,N'-diphenyl-p-phenylene diamine is purified by distillation, collecting the fraction which boils at a temperature of 240° C. at a pressure of 0.5 mm., followed by three recrystallizations from methylene chloride. To 125 milliliters of dry o-dichlorobenzene are added 7.00 grams of the purified diamine and 5.48 grams of terephthaloyl chloride. The mixture is heated to the temperature of reflux while the solution is stirred, and nitrogen is bubbled through for a period of 15 hours. The product is removed by filtration after cooling the reaction mixture, and is slurried with acetone, filtered, and dried for 2 hours in an evacuated oven at a temperature of 100° C. The resulting product is found to exhibit an inherent viscosity of 1.49. Further polymerization is effected by heating the dry solid for a period of two hours at a temperature of 321° C. under reduced pressure. The inherent viscosity is thereby raised to 2.35. The polymer exhibits a melt temperature of 390° C., and has a linear structure comprising the following repeat unit:

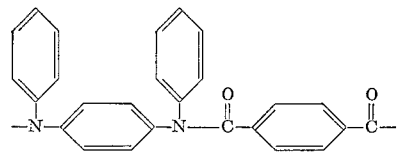

EXAMPLE II

The polyamide derived from N,N'-diphenyl-p-phenylene diamine and terephthaloyl chloride (prepared as described in the preceding example), having an inherent viscosity of about 2.0 is dissolved in a solvent mixture comprising three parts of 1,1,2-trichloroethane and one part of trifluoro acetic acid to the extent of 14% solids. Fibers are dry spun from this solution through a spinneret having five holes of 0.005 inch diameter. The spinneret is maintained at a temperature of 59° C., and the air in the spinning cell is maintained at a temperature of 130° C. The yarn produced is wound up at a speed of 128 y.p.m. The fibers are drawn in steam at about 12 psi. or over a hot plate at a temperature of 250° C. Drawing 5X in steam produces a crystalline yarn. The yarn exhibits a tenacity/elongation/modulus ratio of 2.7/3.6/98. It retains 95% of its tenacity after 65 hours of reflux with 10% sulfuric acid, and 59% of its tenacity after 65 hours of reflux with 10% sodium hydroxide solution.

EXAMPLE III

To a three-necked round-bottom flask equipped with a stirrer, a nitrogen inlet, and a reflux condenser are added 28.00 grams (0.108 mol) of N,N'-diphenyl-p-phenylenediamine (previously purified by twice distilling and by twice recrystallizing from methylene chloride), 21.91 grams (0.108 mol) of isophthaloyl chloride (previously purified by twice recrystallizing from hexane) and 500 ml. of dry o-dichlorobenzene. The mixture is heated under nitrogen with stirring at the temperature of reflux for a period 16 hours. The clear solution which results is found to gel on cooling to room temperature and is precipitated with acetone in a blender. The product is removed by filtration and dried for 25 hours in an evacuated oven at temperatures ranging from about 60° C. to about 100° C. The low polymer is further powder polymerized for a period of two hours at a temperature of 256° C. under a reduced pressure. Films are pressed at a temperature of 290° C. and a pressure of 4,000 p.s.i. The polymer is found to exhibit a melt temperature of 290° C., has an inherent viscosity of 1.45, and consists of a linear structure having the following repeating unit:

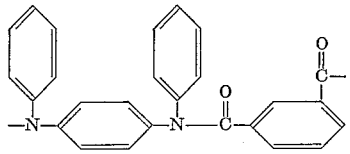

The high thermal stability of this polymer may be demonstrated by thermogravimetric analysis. This test is carried out with an oven containing a balance on which a test sample may be weighed continuously throughout the heating period. The oven is provided with a programmed heat control whereby the temperature within the oven is raised at a linear rate of 5° C. per minute. A sample of powdered polymer weighing about 0.010 gram is placed in a platinum crucible having a flat bottom about 0.25 inch in diameter, the crucible is placed on the balance, a nitrogen atmosphere is introduced into the apparatus, the sample is accurately weighed, the heater is turned on, and the weight of the sample is determined at selected intervals. Under the conditions of this test, a sample of the poly(N,N'-diphenyl-p-phenylenediamine isophthalamide) loses only 15% of its initial weight when heated to 459° C. Under the similar test conditions, the analogous polyamides in which the nitrogen atoms bear either hydrogen or saturated hydrocarbon groups in place of phenyl groups [i.e., poly(p-phenylenediamine isophthalamide) and poly(N,N' - dimethyl-p-phenylenediamine isophthalamide), which may be prepared as shown in Canadian Patent 637,614] lose a more substantial portion of their initial weight.

The hydrolytic stability of poly(N,N'-diphenyl-p-phenylenediamine isophthalamide) is determined by refluxing a suspension of a weighed sample of the powdered polymer (about 0.030 gram) in 20 ml. of 3 normal aqueous sodium hydroxide for 22 hours. The mixture is then cooled and filtered to isolate undissolved polymer, which is then washed with water, dried, and weighed. In this way it is found that the N,N'-diphenyl polyamide of this example has lost 14% of its initial weight. In a similar test poly(p-phenylenediamine isophthalamide) and poly(N,N'-dimethyl - p - phenylenediamine isophthalamide) each lose substantially more of their initial weight.

EXAMPLE IV

A three-necked round-bottom flask is equipped with a nitrogen inlet, a stirrer, and a reflux condenser. To the flask are added 14.00 grams (0.054 mol) of N,N'-diphenyl-p-phenylenediamine, 2.19 grams (0.011 mol) of isophthaloyl chloride, and 8.77 grams (0.043 mol) of terephthaloyl chloride, together with 250 ml. of o-dichlorobenzene. The mixture is heated at the temperature of reflux for a period of 16 hours with stirring. A nitrogen atmosphere is maintained. The mixture gels somewhat upon cooling to room temperature, and the polymer is precipitated with acetone and isolated by filtration. After washing the polymer with an additional quantity of acetone, it is dried in an evacuated oven at a temperature of 70° C. Following powder polymerization of the product for a period of two hours at a temperature of 321° C. under reduced pressure, the polymer is pressed to form a tough film at a temperature of 380° C. The final polymer exhibits an inherent viscosity of 1.80 and a polymer melt temperature of 300° C. This polymer has a structure comprising the following two repeat units in approximately a 4:1 ratio distributed randomly along the chain:

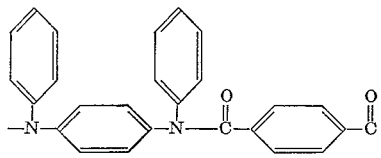

and

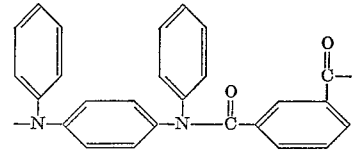

EXAMPLE V

By a procedure analogous with those previously described, a mixture comprising 14.00 grams (0.054 mol) of freshly purified N,N'-diphenyl-p-phenylenediamine, 8.77 grams (0.043 mol) of isophthaloyl chloride, 2.19 grams (0.011 mol) of terephthaloyl chloride, and 250 ml. of dry o-dichlorobenzene is heated at the temperature of reflux in a nitrogen atmosphere for a period of 17 hours while stirring is maintained. Upon cooling to room temperature, the gelled mixture is precipitated into hexane in a blender. The product is removed by filtration and dried overnight in an evacuated oven at a temperature of 70° C. The resulting polymer exhibits an inherent viscosity of 0.57, and a polymer melt temperature of 230° C. The polymer has the structure shown in Example IV, but with approximately a 1:4 ratio of terephthaloyl and isophthaloyl units.

EXAMPLE VI

To a mixture of 3.50 grams (0.0134 mol) of freshly purified N,N'-diphenyl-p-phenylenediamine and 1.38 grams each (0.0067 mol) of isophthaloyl chloride and terephthaloyl chloride are added 28 ml. of o-dichlorobenzene. Following heating for a period of 23 hours at the temperature of reflux in a nitrogen atmosphere, the mixture is cooled to room temperature. The gel which results is treated with acetone in a blender and the polymer is removed by filtration. The product is washed with acetone in the blender and isolated by filtration. Drying is effected by placing the polymeric product in an evacuated oven at a temperature of 70° C. for a period of four hours. The polyamide exhibits an inherent viscosity of 1.06 and a polymer melt temperature of 247° C., and has a structure consisting of a 1:1 ratio of the two units shown in Example IV.

EXAMPLE VII

By a procedure analogous with those previously described, 14.00 grams (0.054 mol) of N,N'-diphenyl-m-phenylenediamine (previously purified by recrystallization from cyclohexane) and 11.00 grams (0.054 mol) of terephthaloyl chloride are dissolved in 110 ml. of chlorobenzene. The mixture is heated at the temperature of reflux for a period of 16 hours while stirring is maintained. Upon cooling to room temperature, the product is precipitated and is isolated by filtration. The solid is washed with acetone, refiltered, and dried overnight in an evacuated oven at a temperature of 70° C. Further polymerization is effected by powder polymerization for a period of one hour at a temperature of 283° C. under reduced pressure. The polymer exhibits an inherent viscosity of 0.41, a polymer melt temperature of 384° C., and a structure comprising a linear arrangement of units having the following formula:

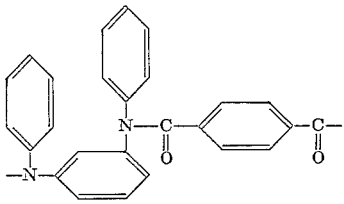

EXAMPLE VIII

In a three-necked round-bottom flask equipped with a reflux condenser, nitrogen inlet, and a stirrer, are placed 14.00 grams (0.054 mol) of recrystallized N,N'-diphenyl-m-phenylenediamine, 11.00 grams (0.054 mol) of freshly recrystallized isophthaloyl chloride, and 110 ml. of dry o-dichlorobenzene. The mixture is heated at the temperature of reflux with stirring for a period of 16 hours. A nitrogen atmosphere is maintained during this time. The reaction mixture is cooled to room temperature, and the gelled mixture is precipitated with acetone. The product is removed by filtration, washed with acetone, refiltered, and dried overnight in an evacuated oven at a temperature of 70° C. Further polymerization is effected by maintaining the temperature of the polymeric product at 283° C. for a period of two hours under reduced pressure. The polymer exhibits a melt temperature of 215° C., an inherent viscosity of 0.15, and has a linear structure comprising the following repeat unit:

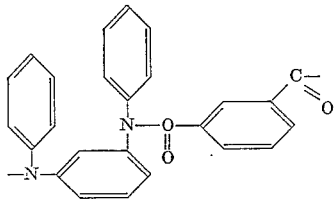

EXAMPLE IX

By a procedure analogous with those previously described, a round-bottom, three-necked flask equipped with a nitrogen inlet, stirrer, and reflux condenser is charged with 14.00 grams (0.54 mol) of N,N'-diphenyl-p-phenylene-diamine (previously recrystallized three times from methylene chloride), 18.46 grams (0.054 mol) of the acid chloride of bis(4-carboxyphenyl) sulfone previously twice recrytsallized from 1,1,2 trichloroethane and distilled), and 250 ml. of o-dichlorobenzene (distilled from barium oxide and dried over calcium hydride). The mixture is heated to the temperature of reflux with stirring and maintained at that temperature for a period of 16 hours while in a nitrogen atmosphere. The mixture partially solidifies upon cooling to room temperature; the solid low molecular weight polymeric product is separated from the supernatant liquid and stirred with hexane in a blender. The product is removed by filtration and dried overnight in an evacuated oven at a temperature of 70° C. It is further powder polymerized for a period of two hours at a temperature of 256° C. under reduced pressure. The resulting polymer is found to exhibit an inherent viscosity of 1.71, and a polymer melt temperature of 286° C. Pressed films of the polymer are tough and clear. The polymer has a linear structure comprising the following repeat unit:

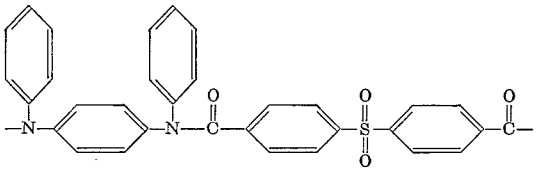

EXAMPLE X

A mixture comprising 10.82 grams (0.042 mol) of recently purified N,N'-diphenyl-p-phenylenediamine, 12.28 grams (0.042 mol) of the recrystallized acid chloride of 4,4'-dicarboxdiphenyl ether, and 250 ml. of pure dry o-dichlorobenzene is heated at the temperature of reflux for a period of 16 hours while stirring and maintaining a nitrogen atmosphere. Upon cooling to room temperature, the product precipitates and is removed by filtration. The solid is washed with hexane, refiltered, and dried overnight in an evacuated oven at a temperature of 70° C. The polymer is further polymerized at a temperature of 321° C. for a period of two hours under reduced pressure; it is found to exhibit an inherent viscosity of 0.30, a polymer melt temperature of 255° C., and comprises the following repeat unit:

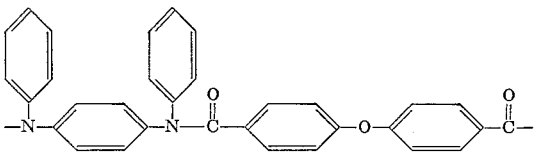

EXAMPLE XI

In a three-necked, round-bottom flask equipped with a nitrogen inlet, reflux condenser, and stirrer are placed 14.00 grams (0.054 mol) of N,N-diphenyl-p-phenylene diamine and 125 ml. of dry o-dichlorobenzene. To this mixture is added a solution comprising 6.83 grams (0.054 mol) of oxalyl chloride dissolved in 125 ml. of dry o-dichlorobenzene. The temperature of the mixture is slowly increased until the temperature of reflux has been reached, and this temperature is maintained for a period of 23 hours. During the entire period, stirring is maintained, and a nitrogen atmosphere is provided. Upon cooling to room temperature, the polymeric product is precipitated and isolated by filtration. The solid is washed with hexane, refiltered, and dried overnight in an evacuated oven at a temperature of 80° C. A film is pressed at a temperature of 335° C. and a pressure of 8,000 p.s.i. The polymer is found to exhibit an inherent viscosity of 0.30, a polymer melt temperature of 335° C., and has the following repeat unit structure:

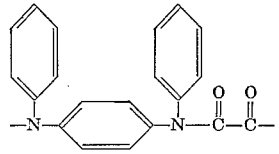

EXAMPLE XII

To 10 grams (0.047 mol) of recrystallized p-phenylaminobenzoic acid are added 100 ml. of freshly distilled thionyl chloride. The mixture is heated at the temperature of reflux with stirring for a period of 15 hours, following which the residual thionyl chloride is removed by low temperature vacuum distillation. The residue is treated with 100 ml. of dry methylene chloride and cooled in an ice bath. Dry hydrogen chloride gas is bubbled in until no further precipitation occurs, and the product is removed by filtration and dried under nitrogen. Upon heating the product in a solution comprising approximately one gram of this product per 10 ml. of dry o-dichlorobenzene, hydrogen chloride is evolved and a low molecular weight polymer results. This linear polymer exhibits a melt temperature of 350° C. and the following repeat unit structure:

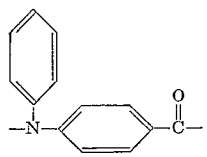

Polyurethanes.—The polyurethanes of this invention are characterized by a high degree of thermal and hydrolytic stability, by high melting points, and by an ability to form tough films and filaments. They are particularly characterized by the ability of fibers comprising these polymers to be converted to fabrics which exhibit excellent wash-wear performance.

These polyurethanes are prepared by the condensation of N,N'-disubstituted aromatic diamines with the bis-chloroformate of aromatic dihydroxy compounds, by the condensation of biscarbamyl halides derived from N,N'-disubstituted aromatic diamines with aromatic dihydroxy compounds, or by the self-condensation of the carbamyl halide derivatives of N-substituted amino phenols. The aromatic diamines of utility, either in the free state or following conversion to the biscarbamyl halide derivatives, are those having the following formula:

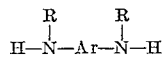

wherein Ar and R have the designations previously given. Among these diamines may be named the following: N,N'- diphenyl-p-phenylenediamine, N,N'-diphenyl-m-phenyldiamine, N,N' - diphenyl - 1,4-naphthylenediamine, N,N' - diphenyl-1,3-naphthylenediamine, N,N'-diphenyl-2,6 - naphthylenediamine, N,N'-diphenyl-1,5-naphthylenediamine, N,N'-diphenylbenzidine, N,N'-bis(2-naphthyl)-p - phenylenediamine, p,p-dianilinodiphenylmethane, p,p'-dianilinodiphenyl ether, p,p'-dianilinodiphenyl sulfone, and other such N,N'-disubstituted aromatic diamines, which may additionally bear one or more nuclear substituents of a non-urethane forming type. If the bicarbamyl halides of these diamines are desired, they may be prepared by reaction of the diamines with phosgene. The aromatic dihydroxy compounds which, either in the free state or in the form of their bischloroformate derivatives, are of utility in the formation of these polyurethanes are those having the following formula: HO—Ar—OH where Ar has the designation previously given. Among suitable compounds of this type may be named the following: resorcinol, hydroquinone, 1,3-dihydroxynaphthalene, 1,4-dihydroxynaphthalene, 1,5 - dihydroxynaphthalene, 2,6-dihydroxynaphthalene, other dihydroxynaphthalenes, 3,3'-dihydroxybiphenyl, 4,4' - dihydroxybiphenyl, 4,4' - isopropylidenebis(2,6 - dichlorophenol), 4,4' - methylenebis(2,6-dichlorophenol), 4,4' - dihydroxydiphenyl ether, and other similar dihydroxy aromatic compounds which may additionally bear one or more nuclear substituents of a non-urethane forming type. Suitable self-condensible carbamyl halide derivatives of N-substituted aminophenols have structures of the following type:

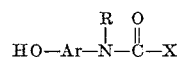

wherein Ar, R, and X have the meanings previously given. The compounds may be prepared by the reaction of phosgene or other carbonyl halide with an aromatic secondary amine, one of the aromatic radicals of which bears a phenolic hydroxyl group. This reaction is normally effected by dissolving the phenolic secondary amine in a suitable solvent and bubbling phosgene or other carbonyl halide through the solution, thus converting the secondary amino group to the corresponding carbamyl halide without affecting the phenolic hydroxyl group.

Suitable secondary amines from which the carbamic acid derivatives may be prepared are characterized by the presence of two aromatic substituents on the amino nitrogen atom, one of which aromatic substituents bears a phenolic hydroxyl group. These compositions may be prepared in accordance with any of several synthetic procedures. Thus for example, they may be prepared by the reaction of an amino phenol with a phenol under the influence of heat and pressure, by the reaction of an amino phenol with an aromatic amine as described in German Patent No. 887,345, or by the reaction of a biphenol with an aromatic amine as described in U.S. Patent No. 2,503,712. Other comparable procedures by which an aromatic primary amino group may be converted to a secondary amino group are also suitable and will be apparent to those skilled in the art.

The preparation of the compounds is normally effected by bubbling the carbonyl halide through a solution of the amino phenol in a suitable solvent at a temperature within the range from 10° C. to about 180° C. Suitable solvents for the reaction include chlorobenzene, o-dichlorobenzene, toluene and tetrachloroethane. The passage of the carbonyl halide through the solution is normally continued for a period of about 4 hours, or until reaction is complete. Isolation of the product may be effected easily by cooling the reaction mixture, under which conditions the phenolic carbamyl halide precipitates and may be removed by filtration. Alternatively, the product may be precipitated by dilution of the reaction mixture with a suitable non-solvent. Among suitable N-substituted amino-phenolic compounds from which these compounds may be prepared by reaction with phosgene may be named the following: p-anilinophenol, m-anilinophenol, 1-anilino-3-naphthol, 1-anilino-4-naphthol, 1-anilino-5-naphthol, 2-anilino-6-naphthol, other similar N-substituted amino-naphthols, 4-anilino-4'-hydroxybiphenyl, 3-anilino-3'-hydroxybiphenyl, 4-anilino-4'-hydroxydiphenyl ether, 4-anilino-4'-hydroxydiphenyl sulfonate, 4-anilino-4'-hydroxydiphenylmethane, and other similar N-substituted amino-phenols which may additionally bear one or more nuclear substituents of a non-urethane forming type.

These polyurethanes may be prepared by various polymerization techniques. Melt polymerization may be utilized, where the condensation of a substituted diamine with an aromatic bischloroformate is contemplated. Suitable conditions for this procedure involve heating the mixture to a temperature of 100° C. for a period of 10 minutes for the initial preparation of low polymer, and further heating the finely divided product to a temperature of 200° C. for a period of 10 minutes for its conversion to high molecular weight. Alternatively, the high temperature solution technique described earlier may be utilized. Suitable solvents for this procedure include o-dichlorobenzene, chlorobenzene, toluene, tetrachloroethane, and various hydrocarbon solvents, and the condensation may be effected at temperatures within the range from about 50° to 300° C. Where the condensation reaction is between a carbamyl chloride group and a phenolic hydroxyl, a melt polymerization may satisfactorily be employed. Thus, by heating the reactant or mixture of reactants to a temperature within the range of between about 150° C. to 250° C. for a period of from two to six hours, a high molecular weight polymer results.

The stability of these polyurethanes is frequently improved by treatment of the high molecular weight polymers with suitable monofunctional compounds to combine with the reactive end-groups of the polymer chain. This may be accomplished by treatment of the finished polymer with the selected monofunctional reagent, or by the introduction to the polymerizing mixture of a measured small quantity of the monofunctional compound. Where the reactive end-groups of the polymer are of the N-substituted amine type, suitable monofunctional reactants include phenylchloroformate, acetic anhydride, benzoyl chloride, and other such organic compositions which are capable of reaction with the amino groups by condensation. Where the polymer end-groups are of the phenolic hydroxyl type, suitable monofunctional reactants include benzoyl chloride, phenyl chloroformate, and other such organic compositions which are capable of reaction with the phenolic groups by condensation. Where the reactive end groups of the polymer are of the chloroformate type, suitable monofunctional reactants include phenol, ammonia, diphenylamine, aniline, other primary and secondary amines, and other similar organic compositions which are capable of reaction with the chloroformate end groups by condensation. When polymers are prepared from the reaction of difunctional reactants of the type which contain, in any one molecule, two similar reactive centers (as in the reaction of a bischloroformate with an N,N'-disubstituted aromatic diamine), the type of end groups on the polymer chain may be controlled by the presence, in the reaction mixture, of a small excess of one reactant. Thus, in the case referred to above, a small excess of the diamine will produce a polymer having amine ends exclusively. Where polymer end groups are of different types (as from the self-condensation of the carbamyl chloride of an N-substituted aminophenol), monofunctional reactants are so chosen that they react by condensation with each type of end group. This is generally effected by utilizing two such monofunctional reactants, each of which is capable of reaction with one of the end group types. For example, where the end groups are of the carbamyl halide and pehnolic hydroxyl types, suitable pairs of monofunctional reactants include benzoyl chloride and diphenylamine, acetic anhydride and phenol, and the like. Treatment of the polymers with these monofunctional compositions may be effected in two stages, reacting the polymer first with one of the reagents and subsequently treating it with the second. Alternatively, it is frequently desirable to introduce to the polymer forming reaction mixture a small quantity of one of the monofunctional reactants, thus forming a polymer having only one type of reactive end group. The final polymer can then be treated with the second monofunctional reactant to condense with the remaining type of end group. This procedure has the added advantage that it provide a means of controlling the molecular weight of the final polymer.

Films, filaments, and other shaped articles comprising the polymers of this invention may be readily prepared either from solutions of the polyurethanes in suitable solvent media, by melt shaping techniques, or by other recognized procedures. For the preparation of useful films and fibers, polymers having an inherent viscoity of at least 0.4 are normally preferred. Where solutions are employed, it is desirable that they contain from about 15% to about 25% of the polymer, and that the viscosity of the solution be between about 100 poises and 300 poises at the temperature of shaping. Suitable solvents for such shaping procedures include the following solvent media: 1,2,2-trichloroethane, sym-tetrachloroethane, dioxane, tetrahydrofuran, chloroform, N,N-dimethylformamide, dimethyl sulfoxide, methylene chloride, and other solvents. Either dry-spinning or wet-spinning techniques may be employed for the preparation of fibers comprising these polymers, but the former is normally preferred. The fibers may be oriented by drawing, which can be effected at room temperature or by the use of a hot pin at a temperature of up to about 180° C. resulting in an attenuation of $2\times$ to $3\times$. Other drawing procedures may also be employed. The melt shaping of the polyurethanes of this invention may be accomplished by standard techniques, and is generally the preferred method of shaping. For this procedure, it is desirable to utilize polymer having an inherent viscosity of greater than 0.30, and temperatures within the range of 200° to 400° C. Some of the polymers may be satisfactorily utilized in shaped articles even when inherent viscosities are lower than 0.30. High spin-stretch ratios can be obtained, ranging as high as 600/1, or even higher. When this advantage is realized, exceptional fiber properties result without further drawing.

Fibers of the polyurethanes of this invention may be woven to form fabrics which are characterized by excellent wash-wear performance. Laundering by conventional means in commercially available machines may be accomplished with ease, and the fabrics may be dried in automatic driers or by hanging. There is no necessity, when automatic washing machines are employed, for eliminating the spin drying which most of these machines utilize, or for drip-drying.

Although wash-wear performance of a polymer is best evaluated in tests under actual use conditions on fabrics made from that polymer, useful guides to such performance may be obtained from simple tests on fibers. Noteworthy among such tests are the tensile recovery, work recovery, and wash-set recovery angle.

The tensile recovery, or recovery from elongation, is expressed as the percent return to the original length when a sample of fiber or yarn is stretched by a factor of 3 percent, for example. In this test the sample is stretched at a rate of 10 percent of its test length per minute until it has reached the desired elongation. The sample is held at this elongation for 30 seconds, and then allowed to relax at a controlled rate of 10 percent per minute. The tensile recovery, expressed in percent, indicates the extent to which the stretched fiber returns to its pre-stretched length.

The work recovery is a measure of the freedom from permanent re-alignment of the polymer molecules following stretching of a fiber or yarn sample of the polymer. The ratio, expressed in percent, of the work done by the polymer molecules in attempting to return to their original alignment following stretching to a pre-determined elongation to the work done on the sample during stretching is termed the work recovery. The work recovery may be determined from the tensile recovery test graph which plots the tension on the sample against the elongation distance. The ratio, expressed as percent, of the area under the controlled relaxation curve to the area under the stretching curve is the work recovery.

The wash-set recovery angle is a measure of the ability of a fiber or yarn sample to return to its original shape after being wrapped around a wire while wet. The test is carried out as follows: The sample is bent 360° around a 25 mil wire mandrel and held in that condition under a load equivalent to .05 gram per denier while being soaked for 2 minutes in a 60° C. aqueous sodium sulfonate-type detergent solution. While still under tension, the sample is then rinsed with water at room temperature, and dried for 1 to 2 hours in a cabinet maintained at 21° C. and 13–15% relative humidity. The sample is then cut at both ends at a distance of about 0.5 inch from the mandrel, thus freeing it from the load weight. The sample is allowed to fall off the mandrel onto a flat glass surface held less than 2 inches away, and is stored at 21° C. and 13–15% relative humidity for at least 16 hours. The extent to which the sample has then returned to its original linear shape is the wash-set recovery angle, expressed in degrees.

When sufficient fiber is available for weaving into fabrics, it is preferred to measure the actual wash-wear performance by laundering fabric samples at 55° C. in a home model automatic washing machine, using a sodium sulfonate-type detergent, followed by tumble-drying at 68° C. in an automatic dryer. After removal from the dryer, the fabrics are allowed to hang for 1 hour or more, and are then evaluated by a group of persons who rate the wash-wear performance on a scale of 0–5, 0 indicating a badly wrinkled fabric that requires extensive ironing, 5 being a perfectly flat fabric having no evidence of wrinkling. An intermediate value of 2, for example, is given to fabrics that require only little ironing to become flat.

The following examples illustrate this embodiment of the present invention by describing the preparation and shaping of the polyurethanes disclosed herein. The examples are not intended to limit the invention in any way. Inherent viscosities are determined in accordance with the formula previously given.

EXAMPLE XIII

Commercially available N,N'-diphenyl-p-phenylene diamine is purified in accordance with Example I. The bischloroformate of hydroquinone (prepared by phosgenation of hydroquinone in solution using N,N-dimethylaniline as acid acceptor) is recrystallized from hexane and further purified by distillation. To 265.5 grams of N,N'-diphenyl-p-phenylene diamine and 235.0 grams of hydroquinone bischloroformate are added 2500 ml. of dry o-dichlorobenzene, and the resulting solution is heated over a period of 2½ hours to the temperature of boiling. Throughout this period, and the subsequent three hours during which reflux is continued, the mixture is stirred and blanketed with nitrogen. To the solution are added 15 ml. of phenyl chloroformate, and reflux is continued with stirring for an additional three hours. Upon cooling the solution, the polymeric product is precipitated, and it is removed by filtration, washed twice with acetone, and dried in an evacuated oven at a temperature of 140° C. After further drying at a temperature of 240–250° C. under high vacuum, the polymer is found to have an inherent viscosity of 0.49 in sulfuric acid, a second-order transition temperature of 185° C., a melt temperature of 290° C., and has a linear arrangement of repeat units having the following structure:

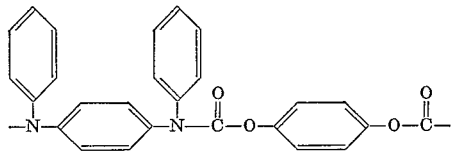

Polyurethane prepared as described in the preceding paragraph is melt-spun at 5400 p.s.i. through a 5-hole spinneret having .007-inch orifices. The spinneret is maintained at 299° C., and the yarn is wound up at 400 feet per minute. The yarn denier per filament is 2.3. These fibers exhibit a tenacity/elongation/modulus ratio of 3.6/22/42, a tensile recovery of 96% at 3% elongation, a work recovery of 86% at 3% elongation, and a wash-set recovery angle of 300°. Under the same test conditions commercial poly(ethylene terephthalate) continuous filament exhibits a tensile recovery of 81%, a work recovery of 42%, and a wash-set recovery angle of 210°.

The polyurethane, prepared as described in the first paragraph of this example, is dry-spun as a 17.5% solution in a 2.5/1 mixture of 1,1,2-trichloroethane/formic acid. A spinneret having 17 orifices, each .004 inch in diameter, is operated at 65° C. and 135 p.s.i. Air at 130° C. flows through the spinning cell at 5 cubic feet per minute, and the yarn is wound up at a rate of 133 yards per minute. The rate of extrusion of the polyurethane solution through the spinneret is about 6.5 ml. per minute. The yarn is then drawn over a pin held at 85° C. to 1.8 times its initial length, given a 7 Z twist, and woven into a 118 x 85 count taffeta fabric. The fabric is then heat-set at 140° C., allowing about 5% shrinkage in each direction. The heat set fabric exhibits 77% recovery from creasing at 40° C. while wet. Under the same conditions a similar fabric woven from commercial poly(ethylene terephthalate) recovers to the extent of 65%. The crease-recovery test used for these measurements is ASTM D1295–53T, modified to the extent of using 2 minutes each for the pressing and recovery steps in place of the standard 5-minute periods. This crease-recovery test indicates that the polyurethane gives more satisfactory performance as a wash-wear fiber than commercial poly(ethylene terephthalate).

Further evidence of the superior properties of the polyurethane as a wash-wear fiber is provided in the standard laundering test described hereinabove. The taffeta fabric exhibits a wash-wear rating of 4.7, when allowed to hang for 2 hours following the tumble-drying step. Under the same conditions a fabric made from commercial poly(ethylene terephthalate) has a rating of about 2.

By the procedure described in Example III, it is found that this polyurethane loses 7.7% of its initial weight when heated to 459° C. under nitrogen. Under the same test conditions, the analogous unsubstituted polyurethane, poly(p-phenylene p-phenylenedicarbamate) of substantially the same molecular weight loses 64.9% of its initial weight, and poly(p-phenylene N,N'-dimethyl-p-phenylenedicarbamate) loses in excess of 25% of its initial weight.

The hydrolytic stability is also determined by the method described in Example III, and it is thereby found that the poly(p-phenylene N,N'-diphenyl-p-phenylenedicarbamate) loses 4.5% of its initial weight. When subjected to the same test, poly(p-phenylene p-phenylenedicarbamate) loses 85% of its initial weight.

The above-mentioned unsubstituted polyurethane may be prepared by the room temperature reaction between equimolar quantities of hydroquinone and p-phenylene diisocyanate in a 5% solution of lithium chloride in N,N-dimethylformamide. The N,N'-dimethyl and other dialkyl derivatives may be made from hydroquinone bischloroformate and the appropriate N,N'-dialkyl-p-phenylenediamine in the presence of an acid-acceptor by the general procedures disclosed in U.S. Patents 2,731,445 and 2,973,333.

EXAMPLE XIV

The polyurethane derived from N,N'-diphenyl-p-phenylene diamine and hydroquinone bischloroformate may also be prepared by a melt polymerization. To 26.03 grams of the pure diamine and 23.50 grams of the pure bischloroformate are added 300 ml. of methylene chloride. Upon warming the mixture, a solution is obtained, and the solvent is permitted to boil off. Heating on a steam bath is continued for a period of 10 minutes, when the reaction mixture has been converted to a solid colorless low polymer having an inherent viscosity of 0.12. This polymer is finely powdered and heated for ten minutes to one hour at a temperature of 196° C. Reduced pressure may be employed for all or a portion of the reaction period. The product has an inherent viscosity of 0.56 and the structure indicated in Example XIII. High molecular weight polymer is also obtained by heating the powder in air at a temperature of 200° C. for a period of ten minutes.

EXAMPLE XV

In a three-necked, round-bottom flask equipped with a nitrogen inlet, reflux condenser, and stirrer are placed 14.00 grams (0.054 mol) of N,N'-diphenyl-p-phenylenediamine (twice recrystallized from methylene chloride), 19.00 grams (0.054 mol) of freshly distilled 2,2-bis(4-hydroxyphenyl) propane bischloroformate, and 250 ml. of distilled and dried o-dichlorobenzene. The mixture is heated by means of an oil bath to the temperature of reflux until the evolution of hydrogen chloride has ceased. This requires approximately three hours, during which the mixture is stirred and maintained in a nitrogen atmosphere. The mixture is permitted to cool to room temperature and the polymer is precipitated with cyclohexane in a blendor. The product is isolated by filtration, washed with cyclohexane, and dried overnight in an evacuated oven under nitrogen. Polymerization is continued by heating the dry powdered material at a temperature of 196° C. under reduced pressure for a period of two hours. The polymer is found to exhibit a melt temperature of 290° C. and an inherent viscosity of 0.33. Tough films are prepared by melt pressing at a pressure of 8,000 p.s.i. and at temperatures ranging from 250° C. to 400° C. Films are also dry cast from cyclohexanone and found to be tough and creasable. The polymer has a linear arrangement of repeat units having the following structure:

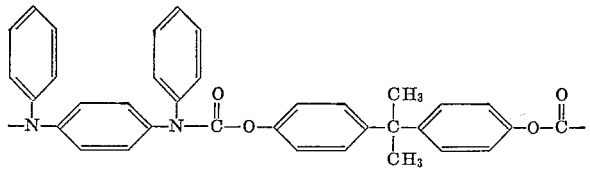

Polymer prepared as described in the preceding paragraph is made into fibers by dry-spinning from a 15% solution in dioxane at a rate of 2.9 ml. per minute through a spinneret having 5 orifices each .005 inch in diameter, using a pressure of 110 p.s.i. The spinneret temperature is 75° C., and the cell air temperature is 132° C. The yarn is wound up at 135 yards per minute, and is subsequently dried in a vacuum oven to remove additional solvent. After drawing to about 2 times the dried length over a pin at 100–110° C., the yarn exhibits a tenacity/elongation/modulus ratio of 1.6/37/30, a tensile recovery of 90% at 3% elongation, a work recovery of 79% at 3% elongation, and a wash-set recovery angle of 295°. These properties are indicative of wash-wear performance superior to that of commercial poly(ethylene terephthalate).

EXAMPLE XVI

By a procedure analogous with those previously described, 14.00 grams (0.054 mol) of twice-recrystallized N,N'-diphenyl-p-phenylenediamine, 16.74 grams (0.054 mol) of 4,4'-dihydroxydiphenyl bischloroformate, and 250 ml. of distilled and dried o-dichlorobenzene are placed in a reaction flask. The mixture is heated by means of an oil bath to the temperature of reflux, and this temperature is maintained for a period of 5 hours, at which time no additional hydrogen chloride is being evolved. After cooling the mixture to room temperature, the product is precipitated with acetone in a blendor, isolated by filtration, washed twice with acetone in the blendor, filtered and dried overnight in an evacuated oven at a temperature of 80° C. while a nitrogen atmosphere is imposed. Polymerization is furthered by heating the powdered polymer at a temperature of 256° C., for a period of two hours under reduced pressure. The resulting polymer is melt pressed into tough films at a temperature of 350° C. and a pressure of 8,000 p.s.i. The polymer is found to possess an inherent viscosity of 0.81 and a polymer melt temperature of 320° C. The polymer repeat unit has the following structure:

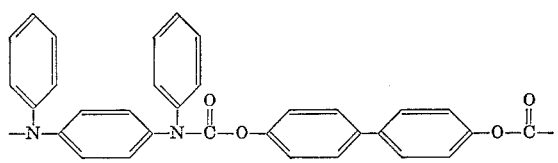

The polymer is dry-spun from a 17% solution in 1,1,2-trichloroethane, using a 5-hole spinneret having .005 inch orifices. The solution is supplied to the spinneret at 58° C. and at a rate of 2.9 ml. per minute. The air in the cell is held at 125° C. and the yarn is wound up at 126 yards per minute. The yarn is drawn to 2.1 times its length in 10 p.s.i. steam, and then exhibits a tenacity/elongation/modulus ratio of 3.3/40/41, a tensile recovery of 87% at 3% elongation, a work recovery of 64% at 3% elongation, and a wash-set recovery angle of 290°.

EXAMPLE XVII

A three-necked, round-bottom flask equipped with a nitrogen inlet, a stirrer, and a reflux condenser, is charged with 6.73 grams (0.020 mol) of N,N'-diphenylbenzidine, 4.70 grams (0.020 mol) of freshly distilled hydroquinone bis-chloroformate, and 100 ml. of distilled and dried o-dichlorobenzene. The mixture is heated to the temperature of reflux while stirring and maintained in a nitrogen atmosphere under these conditions for a period of one hour. No hydrogen chloride gas is being evolved after that time. The mixture is permitted to stand at room temperature overnight, and the product is precipitated with cyclohexane in a blendor. The polymer is isolated by filtration, washed twice with additional portions of cyclohexane in a blendor, refiltered, and dried for six hours in an evacuated oven at a temperature of approximately 70° C. A very tough film is cast from a solution comprising 3 grams of the polymer in 15 ml. of 1,1,2-trichloroethane. The polymer exhibits an inherent viscosity of 0.76 (when measured in 1,1,2-trichloroethane), and repeat units having the following structure:

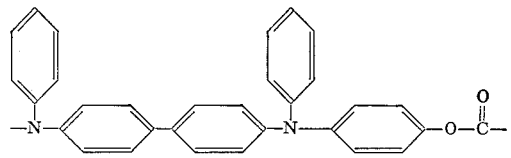

EXAMPLE XVIII

A mixture comprising 6.73 grams (0.020 mol) of N,N'-diphenylbenzidine, 7.06 grams (0.020 mol) of freshly distilled 2,2-bis(4-hydroxyphenyl) propane bischloroformate, and 100 ml. of distilled and dried o-dichlorobenzene is heated in a nitrogen atmosphere with stirring to the temperature of reflux for a period of one hour. The evolution of hydrogen chloride has ceased at the completion of this period. The mixture is cooled to room temperature, and the product is precipitated by treatment of the mixture with cyclohexane in a blendor. After being twice washed with cyclohexane, the polymer is isolated by filtration and dried in an evacuated oven overnight at a temperature of 80° C. Tough films are cast from solutions of the polymer in 1,1,2-trichloroethane. The polymer exhibits an inherent viscosity of 0.51 (when measured in 1,1,2-trichloroethane) and a polymer melt temperature of 270° C., and comprises repeat units having the following structure:

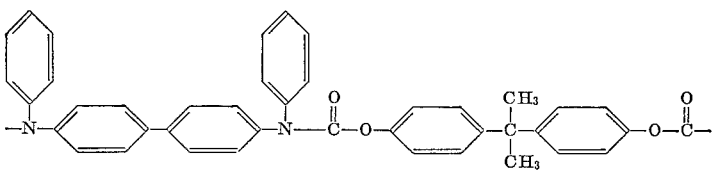

EXAMPLE XIX

In a three-necked, round-bottom flask are placed 21.00 grams (0.081 mol) of freshly recrystallized N,N'-diphenyl-p-phenylenediamine, 18.98 grams (0.081 mol) of redistilled resorcinol bischloroformate, and 250 ml. of dry o-dichlorobenzene. The mixture is heated while in a nitrogen atmosphere to the temperature of reflux and maintained with stirring at that temperature until the evolution of hydrogen chloride has ceased, this being accomplished in about one hour. The polymer is precipitated by treatment with cyclohexane in a blendor, further washed with cyclohexane, isolated by filtration, and dried overnight in an evacuated oven at a temperature of 70° C.

Further powder polymerization is effected by heating the polymer at a temperature of 100° C. under reduced pressure for a period of two hours. The polymer exhibits a melt temperature of 164° C., an inherent viscosity of 0.12, and comprises repeat units having the following structure:

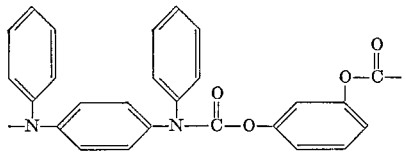

EXAMPLE XX

By a procedure analogous with those previously described, 2.60 grams (0.010 mol) of N,N'-diphenyl-p-phenylenediamine, 4.91 grams (0.010 mol) of 4,4'-isopropylidene bis(2,6-dichlorophenyl chloroformate), and 90 ml. of dry o-dichlorobenzene are heated together at the temperature of reflux with stirring for a period of 5 hours. Upon cooling to room temperature, the polymer remains soluble in solution, and the mixture is treated with cyclohexane in a blendor. The product is removed by filtration and dried overnight in an evacuated oven at a temperature of 75° C. It is further powder polymerized for a period of two hours at a temperature of 196° C. under reduced pressure, following which it exhibits an inherent viscosity of 0.10 (when measured in 1,1,2-trichloroethane), and a polymer melt temperature of 230° C. This polymer is a polyurethane having repeat units with the following structure:

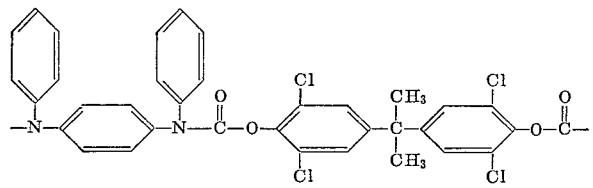

EXAMPLE XXI

In a polymer tube equipped with a capillary nitrogen inlet are placed 20 grams (0.08 mol) of N-chlorocarbonyl-p-anilinophenol. The tube and its contents are heated to a temperature of 190° C. and maintained at that temperature for a period of 15 minutes while a reduced pressure of 25 mm. is imposed. The pressure is then reduced to 1.0 mm. and the temperature is kept at its former level for a period of 1¼ hours, following which the temperature is raised to 245° C. while the pressure is maintained at 1.0 mm. for an additional three hours. Polymerization occurs rapidly under these conditions, and the polymer is removed from the tube by dissolving in methylene chloride. Precipitation of the product is effected by treatment of the solution with methanol, following which the polymer is isolated by filtration, washed and dried. It is found to exhibit a polymer melt temperature of 256° C. and an inherent viscosity, when measured in m-cresol, of 0.6. Tough films are prepared by melt-pressing or by casting from solution. This polymer is a polyurethane in which the repeat unit has the following structure:

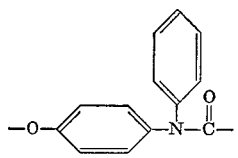

EXAMPLE XXII

A solution comprising 6.73 grams (0.02 mol) of N,N'-diphenylbenzidine and 6.22 grams (0.02 mol) of 4,4'-biphenylene bischloroformate dissolved in 100 ml. of dry o-dichlorobenzene is heated to the temperature of reflux and maintained at that temperature with stirring for a period of one hour, by which time no additional hydrogen chloride is being evolved. The polymeric product is isolated by precipitation with cyclohexane in a blendor and is twice washed with cyclohexane and dried. The polyurethane exhibits an inherent viscosity of 0.94 when measured in 1,1,2-trichloroethane and a polymer melt temperature of 350° C. A portion of the polymer is dissolved in 1,1,2-trichloroethane to form a solution containing approximately 10% solids and a clear, tough film is cast. The film is tough and creasable even after heating at a temperature of 275° C. for a period of fifteen days in air. The polyurethane comprises repeat units having the following structure:

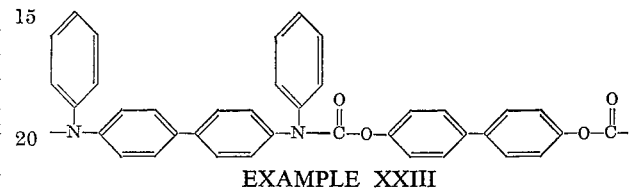

EXAMPLE XXIII

Equivalent qualities of p-anilinophenol and the chloroformate of thiophenol are dissolved in chlorobenzene and heated to a temperature of 130° C. The resulting product melts at a temperature of 185° C., exhibits an elemental analysis corresponding to $C_{19}H_{15}NO_2S$, and is characterized by infrared spectral analysis as the urethane having the structure:

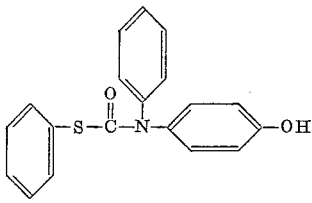

A 2.5 gram portion of the above urethane is heated with 0.02 gram of tributyl tin acetate for a period of three hours at a temperature of 225° C. in a nitrogen atmosphere, and for a further period of sixteen hours at the same temperature and at a pressure of 1 mm. Thiophenol is eliminated under these conditions and a viscous melt of the corresponding N-substituted polyurethane results. Heating is continued for an additional period of four hours at a temperature of 278° C. and at a pressure of 1 mm. to further polymerize the composition. The resultant polymer exhibits an inherent viscosity (measured in cresol) of 0.3, a polymer melt temperature of 250° C., an ability to be converted to fibers from the melt, and possesses the structure shown in Example XXI.

EXAMPLE XXIV

The procedure described by Craig in the Journal of the American Chemical Society, vol. 55, pages 3723–7 (1933), is used to prepare p,p'-dianilinodiphenylmethane, B.P. 268–273° C. at 0.40 mm. mercury. The product is purified by recrystallization from ethyl alcohol after decolorization with activated charcoal, and then melts at 122–123° C. The composition found by elemental analysis corresponds to the formula, $C_{25}H_{22}N_2$.

A solution is made by warming a mixture of 10.51 g. (0.03 mole) p,p'-dianilinodiphenylmethane and 90 ml. chlorobenzene. To this solution, maintained under a nitrogen atmosphere, is added a solution of 7.05 g. (0.03 mole) of hydroquinone bischloroformate. The mixture is then heated to its boiling point, and is stirred under reflux for 23 hours. Hydrogen chloride is evolved, and part of the polymer precipitates out. The pale yellow mixture is allowed to stand at room temperature for 1 day; a small amount of solid polymer separates from the mixture. The mixture is poured into petroleum ether to precipitate additional polymer. The polymer is removed by filtration, washed with acetone and ethyl alcohol, and dried at 70°

C. in vacuo. The white polymer weighs 14.98 g., forms tough films when pressed at 285° C., exhibits an inherent viscosity of 1.45 in m-cresol and a sticking temperature of 346–370° C., and has a repeat unit with the following structure:

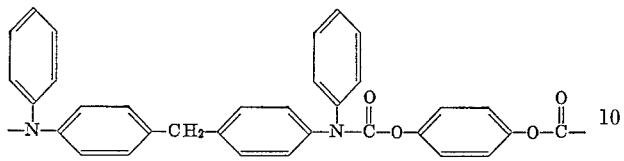

Fibers are dry-spun from polymer ($\eta_{inh}=1.24$) prepared as described above, using a 25% solution in dimethylformamide. A spinneret with 5 holes, each .005 inch in diameter, is used at 122° C.; the air in the spinning cell is at 166–209° C. The fibers are wound up at a rate of 137 yards per minute, combined into a fifteen-filament yarn, soaked overnight in water, drawn 2× in 10 p.s i. steam, and heat-set for 30 minutes in 15 p.s.i. steam. After a 30-minute boil-off, washing, and drying, the fibers exhibit a tenacity/elongation/modulus ratio of 2.1/49/30, a tensile recovery of 95% at 3% elongation, a work recovery of 83% at 3% elongation, and wash-set recovery angles in the range of 300–320°.

EXAMPLE XXV

The procedure described by Craig in the Journal of the American Chemical Society, vol. 60, pages 1458–1465 (1938) is used to prepare p,p'-dianilinodiphenylpropane from acetone and diphenylamine. The product is isolated by distillation at 280–283° C. at 0.35 mm. mercury, treated with activated charcoal, and recrystallized from ethyl alcohol to give a solid that melts at 90–100° C.

A solution of 3.785 g. (0.01 mole) p.p'-dianilinodiphenylpropane in 30 ml. chlorobenzene is mixed with a second solution prepared from 3.532 g. (0.01 mole) of the bischloroformate of p,p'-diphenylolpropane and 30 ml. chlorobenzene. Nitrogen is bubbled slowly through the mixture while the mixture is heated at 115°–130° C. under reflux for one day. The yellow solution is cooled and poured into ethyl alcohol to precipitate the solid polyurethane, which is removed by filtration, washed with alcohol and petroleum ether, and dried at 75° C. in vacuo. The dried white polymer weighs 6.54 g., exhibits a polymer melt temperature of 360° C. and an inherent viscosity of 0.64 in m-cresol. Tough, flexible films are cast from solutions of the polymer in chloroform. The repeat unit in the polymer has the structure:

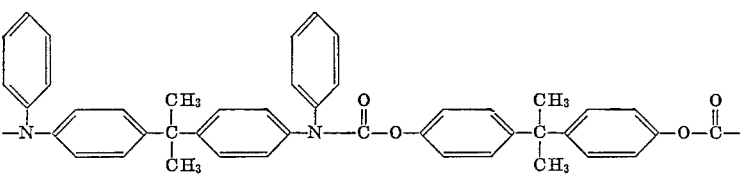

EXAMPLE XXVI

Commercially available 2,5-ditertiarybutylhydroquinone is converted to its bischloroformate by reaction with excess phosgene. The bischloroformate boils at 143–149° C. at 0.8 mm. mercury, and is recrystallized from n-hexane to give crystals that melt at 123–124° C. and analyze correctly for the formula $C_{16}H_{20}O_4Cl_2$.

A polyurethane is prepared from the above mentioned bischloroformate (6.97 g., 0.02 mole) and N,N'-diphenyl-p-phenylenediamine (5.20 g., 0.02 mole) in 120 ml. o-dichlorobenzene at reflux for 46 hours. The clear yellow solution is cooled and poured into petroleum ether to precipitate the polyurethane, which is removed by filtration, washed with petroleum ether, and dried at 60° C. in vacuo to give the polymer in the form of a gray-white solid. The polymer melt temperature is 344° C., and the inherent viscosity is 0.43 in a mixture of trichloroethane and phenol; films are made by pressing at 345° C. The polymer comprises repeat units having the structure:

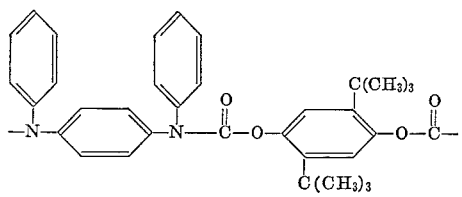

Polyureas

The polyureas of this invention are, like the other polymer types, characterized by high levels of resistance to thermal and hydrolytic degradation, and by the presence in the polymeric chain of amide-like linkages, the nitrogen atoms of which bear monovalent aromatic substituents of the types to which reference has previously been made. The polyureas are also characterized by their ability to be converted to fibers and films.

These polyureas are prepared from N,N'-disubstituted aromatic diamines by condensation with the biscarbamyl halides of similar N,N'-disubstituted aromatic diamines. The diamines of utility in the preparation of these polymers have the following formula:

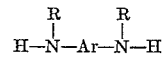

wherein Ar and R have the meanings previously given. Among suitable diamines of this type may be named the following: N,N'-diphenyl-p-phenylenediamine, N,N'-diphenyl-m-phenylenediamine, N,N'-diphenyl-1,4-naphthylenediamine, N,N'-diphenyl-1,3-naphthylenediamine, N,N'-diphenyl - 2,6 - naphthylenediamine, N,N' - diphenyl - 1,5-naphthylenediamine, N,N'-diphenylbenzidine, and the like. Any of the above-named N,N'-disubstituted aromatic diamines may be converted to the corresponding biscarbamyl halides by reaction with phosgene or with carbonyl bromide in accordance with known procedures.

The preparation of high molecular weight polyureas may be effected by dissolving equivalent amounts of the diamine and the biscarbamyl halide or the biscarbamate ester in a suitable solvent having a boiling point in the range of 50°–350° C. Upon maintaining the solution at the temperature of reflux for a period of 5–20 hours, a high molecular weight product is formed. Hydrogen chloride produced as a by-product of the condensation is volatilized under the conditions of reaction. The polymeric product may normally be isolated by cooling the reaction mixture and filtering the precipitated polymer. In those instances where the polymer remains soluble in the cooled reaction mixture, it may be isolated by dilution of the mixture with a suitable non-solvent. Suitable solvents for effecting solution polymerization are generally chosen from the class of hydrocarbons and chlorinated hydrocarbons, as chlorobenzene, o-dichlorobenzene, toluene, xylene, tetrachloroethane, and the like. Particularly preferred is o-dichlorobenzene, whose temperature of reflux permits rapid polycondensation.

Polyureas prepared by the above techniques may be utilized directly in the formation of shaped articles, which may be prepared from solutions of the polymers in suitable solvents, by melt shaping, or by other recognized procedures. The spinning of fibers from solution may be accomplished either by dry-spinning or by wet-spinning techniques, although the former is preferred. Suitable solvents include methylene chloride, 1,1,2-trichloroethane, tetrachloroethane, mixtures of 1,1,2-trichloroethane and trifluoroacetic acid, and the like, and spinning solutions normally contain between 12 and 25% of the polymer. Such solutions have viscosities within the range of 100–300 poises at the spinning temperature. Dry-spinning may be accomplished in accordance with accepted procedures, and the resulting fibers may be drawn and oriented by conventional techniques.

The following example illustrates the preparation and properties of a polyurea of this invention. It is not intended to limit the invention in any manner.

EXAMPLE XXVII

A solution comprising 150 grams (0.577 mol) of distilled and recrystallized N,N'-diphenyl-p-phenylenediamine in 1200 ml. of dry o-dichlorobenzene is heated to a temperature of 130° C., and maintained at that temperature for a period of four hours while phosgene is bubbled through the solution. The reaction mixture is cooled and the biscarbamyl chloride is removed by filtration, washed, dried, and recrystallized from o-dichlorobenzene. A portion of the biscarbamyl chloride is converted to the corresponding biscarbamyl bromide by heating a mixture of 40 grams (0.104 mol) of the former with 300 grams (1.107 mol) of phosphorus tribromide, and maintaining the mixture at the temperature of reflux with stirring for a period of two hours. The mixture is cooled by immersion of the flask in an ice bath, the product is removed by filtration, washed, dried, and recrystallized from o-dichlorobenzene. A 9.48 gram (0.02 mol) portion of the biscarbamyl bromide is dissolved together with 5.20 grams (0.02 mol) of distilled and recrystallized N,N'-diphenyl-p-phenylenediamine in 125 ml. of dry o-dichlorobenzene. The mixture is heated to the temperature of reflux and maintained at that temperature with stirring for a period of 24 hours. After cooling, the product is precipitated by dilution of the reaction mixture with hexane in a blendor. The low polymeric product is separated by filtration, washed, and dried. Further polymerization is effected by heating the product under reduced pressure for a period of two hours at a temperature of 256° C. The resulting polyurea exhibits an inherent viscosity, when measured in sulfuric acid, of 0.28, and a melting point of 266° C. Fibers of the polymer can be manually spun from the melt. This polyurea has a structure comprising repeat units corresponding to the formula:

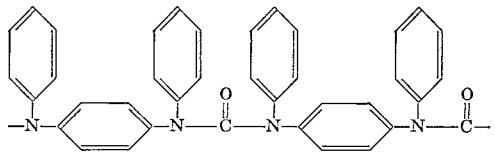

What is claimed is:

1. A fiber-forming nitrogen-containing linear condensation polymer consisting essentially of recurring structural units of one of the following:

(1) 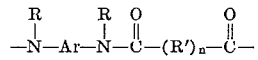

(2) 

wherein R is phenyl which may be substituted with lower alkyl, halogen or p-phenyl radicals and Ar and R' are selected from the group consisting of phenylene, naphthylene, biphenylene, alkylene diphenylene, sulfonyl diphenylene, oxy diphenylene and the halo- and lower alkyl ring-substituted derivatives thereof; and $n$ is a cardinal number not greater than 1.

2. A fiber-forming nitrogen-containing linear condensation polymer consisting essentially of a plurality of the following recurring structural units:

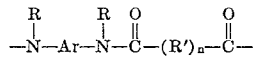

wherein Ar and R' are divalent carbocyclic aromatic radicals, R is a monovalent carbocyclic aromatic radical and $n$ is a cardinal number not greater than one.

3. A fiber-forming nitrogen-containing linear condensation polymer consisting essentially of a plurality of the following recurring structural units:

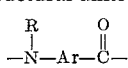

wherein Ar is a divalent carbocyclic aromatic radical and R is a monovalent carbocyclic aromatic radical.

4. A fiber-forming polymer consisting essentially of a plurality of the following recurring structural units:

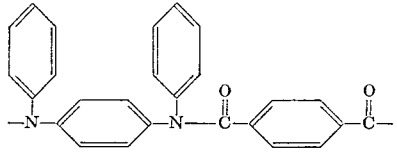

References Cited

UNITED STATES PATENTS

| | | | |
|---|---|---|---|
| 2,149,286 | 3/1939 | Graves | 260—78 |
| 2,158,064 | 5/1939 | Carothers | 260—78 |
| 3,232,910 | 2/1966 | Preston | 260—78 |
| 3,264,270 | 8/1966 | McIntyre | 260—78 |
| 3,094,511 | 6/1963 | Hill et al. | 260—78 |
| 3,164,571 | 1/1965 | Cotter | 260—77.5 |

WILLIAM H. SHORT, *Primary Examiner.*

H. D. ANDERSON, *Assistant Examiner.*

U.S. Cl. X.R.

117—161; 161—227; 260—78, 77.5, 33.8, 32.6, 31.2, 30.8; 264—176, 210